United States Patent
Auger et al.

(10) Patent No.: US 7,590,489 B2
(45) Date of Patent: Sep. 15, 2009

(54) METHOD FOR GUIDING IN REAL TIME A LANDBORNE VEHICLE PROVIDED WITH AN OFF-BOARD NAVIGATION SYSTEM

(75) Inventors: Jean-Laurent Auger, Fontaine Etoupefour (FR); Christophe Lemee, Breteville sur Odon (FR); Jean-Michel Magret, Thorigne-Fouillard (FR)

(73) Assignee: France Telecom, Paris (FR)

( * ) Notice: Subject to any disclaimer, the term of this patent is extended or adjusted under 35 U.S.C. 154(b) by 646 days.

(21) Appl. No.: 11/073,706

(22) Filed: Mar. 8, 2005

(65) Prior Publication Data

US 2005/0203677 A1  Sep. 15, 2005

(30) Foreign Application Priority Data

Mar. 8, 2004  (FR) .................................. 04 02406

(51) Int. Cl.
*G01C 21/00* (2006.01)

(52) U.S. Cl. .................. 701/210; 701/201; 701/202; 701/214

(58) Field of Classification Search .................. 701/201; 340/948
See application file for complete search history.

(56) References Cited

U.S. PATENT DOCUMENTS

| 5,625,668 | A | * | 4/1997 | Loomis et al. | 455/456.5 |
| 5,890,092 | A | * | 3/1999 | Kato et al. | 701/216 |
| 6,542,818 | B1 | * | 4/2003 | Oesterling | 701/209 |
| 6,925,378 | B2 | * | 8/2005 | Tzamaloukas | 701/200 |
| 7,089,110 | B2 | * | 8/2006 | Pechatnikov et al. | 701/210 |
| 7,149,625 | B2 | * | 12/2006 | Mathews et al. | 701/209 |
| 2001/0029425 | A1 | | 10/2001 | Myr | |
| 2004/0030493 | A1 | * | 2/2004 | Pechatnikov et al. | 701/208 |

* cited by examiner

*Primary Examiner*—Jack W. Keith
*Assistant Examiner*—Helal A Algahaim
(74) *Attorney, Agent, or Firm*—Young & Thompson (57) ABSTRACT

The invention relates to a method for guiding a vehicle (Ve) provided with an off-board navigation system relative to an external navigation server (S). It consists in transmitting (A) from the positioning module of the vehicle (Ve) to the server (S) position coordinates of the vehicle, calculating (B) the initial latency time (T1) and the return latency time (T2) between the vehicle and server, estimating (C) the distances covered (X1, Y2) by the vehicle (Ve) during the initial latency time and the return latency time, correcting (D) the position coordinates of the vehicle at the current moment by the value of the covered distances (X1, X2) in order to generate corrected coordinates (XC, YC), and triggering (E) the transmission of a guidance command if the corrected data corresponds to a positioning of the vehicle (Ve) allowing an appropriate reaction of the user of the vehicle. Application in the industry of off-board guidance systems.

11 Claims, 4 Drawing Sheets

METHOD FOR GUIDING IN REAL TIME A LANDBORNE VEHICLE PROVIDED WITH AN OFF-BOARD NAVIGATION SYSTEM

TECHNICAL FIELD

The invention relates to vehicle-external road navigation and land guidance systems, also known as "off-board" road navigation systems.

BACKGROUND TO THE INVENTION

Road navigation systems are systems for assisting the driving and guiding of landborne vehicles that allow an itinerary between a departure point and an arrival point specified by the driver and/or the current position of the vehicle to be calculated, and the itinerary to be presented, by means of a scroll-down display, for example, for use in a more or less interactive manner.

For this purpose, the navigation system accesses a mapping database that groups all of the road segments, and the itinerary is calculated by linking the road segments between the departure and arrival points.

This procedure is capable of generating numerous itineraries.

A supplementary function, which allows a particular route to be determined as a function of the preferences of the driver, is generally added.

For example, he may select the itinerary exhibiting the shortest distance between the departure and arrival points, but he may also select the itinerary allowing these two points to be connected as quickly as possible. These two itineraries may be identical, or completely or partially different. The driver may also indicate whether or not he wishes to use motorway segments or, conversely, avoid all of the corresponding toll charges.

There are currently three types of navigation system.

The first type, known as an on-board system, is an autonomous system installed on board a vehicle and having its own mapping, generally stored on an optical storage medium such as a CD ROM or DVD ROM.

The second type, known as a hybrid system, is a system in which part of the information (in particular the ground mapping) is placed in a remote server and part of the ground mapping, that assisting the itinerary once it has been calculated, is downloaded into the terminal, which will use it in the manner of an on-board system.

The third type, known as an off-board system, is a system in which all of the processing is carried out in a remote server. The on-board terminal in the vehicle serves merely to return the GPS location information to the server, then to restore the indications issuing from the server, in particular the guidance commands. The communication between the server and the on-board terminal is conducted via cellular telecommunication networks.

In an off-board navigation system, of the third type, the itinerary is calculated and stored in the server. Said server scrolls through and displays this itinerary and provides the terminal with the guidance information as a function of the position information that it receives from the GPS positioning module of said terminal.

Current off-board navigation systems rely on cellular telephony communication networks in order to exchange information between the server and the on-board terminal in a vehicle.

None of the aforementioned navigation systems allows for the transmission periods that are inherent to the transmission system used. Latency times, which are defined as the periods between the emission of an item of information and the receipt thereof, are quite simply ignored.

The aim of the present invention is to overcome the aforementioned drawbacks of the off-board navigation systems of the prior art.

In particular, one aim of the present invention is to take into account, in an adaptive manner, the latency periods of the transmission network used by the off-board navigation systems of the prior art, in order to improve their mode of operation and reliability independently of the characteristics or the speed of the vehicle.

A further aim of the present invention is also to implement a method and a vehicle-external navigation server allowing an on-board terminal on a vehicle having an off-board navigation system to be provided with guidance information corresponding substantially to the location of the vehicle and the on-board system thereon at the moment when they receive this guidance information, and not to their previous location at the moment when the on-board positioning module on this vehicle sent its geographical position.

SUMMARY OF THE INVENTION

Accordingly, the present invention relates to a method for guiding in real time a landborne vehicle provided with an on-board navigation system, wherein the navigation and guiding data is processed in a remote manner in a navigation and guiding server external to the vehicle, from an on-board positioning module in this vehicle and communicating information regarding the position of the vehicle to the server.

It is noteworthy in that it consists at least in transmitting from the positioning module to the server position coordinates of the vehicle at a current moment, calculating, in the server, the initial latency time and the return latency time, the initial transmission time and the return transmission time, respectively, between the vehicle and the server; estimating, from current mapping information corresponding to the current geographical position of the vehicle and from an estimation of the average speed thereof over at least part of a route of this vehicle located relative to this current mapping information, the distance covered by the vehicle during the initial latency time and the return latency time, respectively, correcting the position coordinates of the vehicle at the current moment by the value of the distances covered during the initial latency time and the return latency time, respectively, in order to generate corrected position coordinates, triggering the transmission of a command for guiding said server toward the vehicle if the corrected coordinates correspond to a positioning of the vehicle allowing an appropriate reaction of the user of the vehicle in accordance with the guidance command.

The invention also relates to a navigation and guiding server that is external to a landborne vehicle, this server receiving position coordinates of the vehicle at current moments and comprising at least one module for adapting mapping information as a function of the position coordinates, a module for calculating the road sheet itinerary steering this mapping adaptation module and a module for guiding the vehicle receiving position information delivered by the information adaptation module and delivering a guidance command on coincidence of the position information delivered by said information adaptation module with position information regarding a change in direction of a route located relative to this mapping information.

It is noteworthy in that it also comprises a module for calculating the initial latency time and the return latency time, the initial transmission time and the return transmission time, respectively, between the landborne vehicle and the server, a module for estimating, from current mapping information corresponding to the current geographical position of the vehicle and from an estimation of the average speed of the vehicle over at least part of a route of the vehicle relative to this current mapping information, the distance covered by the vehicle during the initial latency time and the return latency time, respectively, and a module for correcting the position coordinates of the vehicle at the current moment by the value of the distances covered during the initial latency time and the return latency time, respectively, in order to generate corrected position coordinates, the corrected position coordinates being substituted for position information delivered to the guiding module, thus allowing the transmission of a guidance command to be triggered from the server to the vehicle if the corrected coordinates correspond to a positioning of the vehicle allowing an appropriate reaction of the user of the vehicle in accordance with the guidance command.

The method and the server according to the invention are used in the equipment of off-board road navigation and land guidance systems.

BRIEF DESCRIPTION OF DRAWINGS

A better understanding will be facilitated by the following description and drawings, in which:

FIG. 1b is, by way of example, a diagram of a situation representing a drawback of the remote navigation systems of the prior art as illustrated in FIG. 1a;

DESCRIPTION OF PREFERRED EMBODIMENT

A more detailed description of the method for guiding in real time a landborne vehicle provided with an off-board navigation system according to the subject of the present invention will now be given with reference to FIGS. 1 to 1b, which relate to the prior art, and 2a, 2b, and 2c.

Figure 1A:
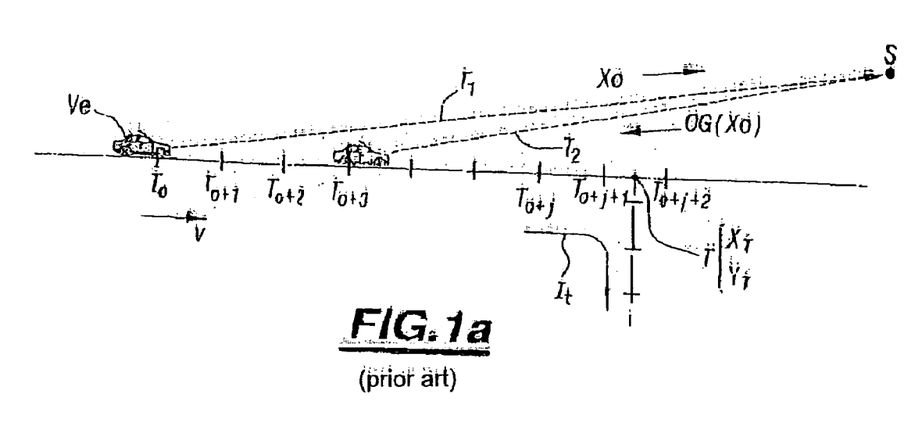
FIG. 1a is, by way of example, a time diagram of the exchanges of information between a vehicle and a server of a remote navigation system of the prior art.
Figure 1B:
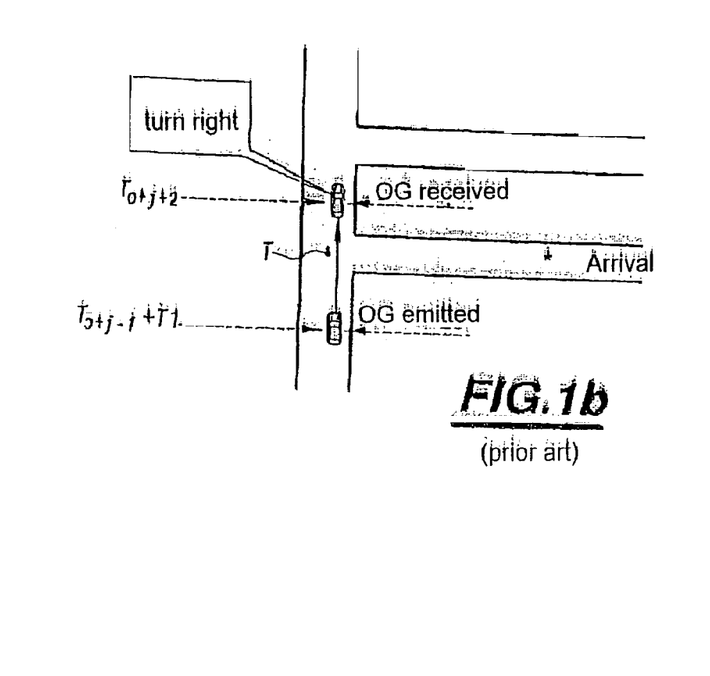

FIGS. 1a and 1b illustrate a situation of a vehicle $V_e$ equipped with a remote navigation system of the prior art, the positioning module of which sends positioning data $X_0, Y_0$ at successive moments $T_0, T_{0+1}, \ldots, T_{0+j}$, for example, to a server S via a cellular radiotelephony network, for example.

This information is processed by the server S, which positions the vehicle $V_e$ relative to the itinerary $I_t$ calculated therefor.

If, by way of non-limiting example, the position coordinates are transmitted for an average speed of the vehicle v at successive moments $T_0, T_{0+1}$ to $T_{0+j}$, and at successive regular intervals, the time $T_1$ for transmitting the position coordinates of the vehicle $V_e$ to the server S and the time for receiving a guidance command OG may represent a plurality of periods of time, for example.

By way of non-limiting example, the initial latency time $T_1$ and the return latency time $T_2$ are known to have a value, the sum of which is equal, for example, to three successive periods $T_0$ to $T_{0+3}$.

With reference to FIG. 1a, if the server S then emits a guidance command OG corresponding to the position coordinates $X_0, Y_0$ emitted at the previous moment $T_0$, this effective guidance command OG triggers a command, for example "turn right", if $X_0=X_T$ and $Y_0=Y_T$.

It will be noted that the calculation times of the modules fitted to the server S are negligible relative to the initial latency time and the return latency time, respectively.

However, if the vehicle $V_e$ emits the position coordinates at a moment $T_0$ or at any successive moment $T_{0+j}$, the server S receives this information at the moment $T_0+T_1$, $T_1$ being designated as the latency time of the network in the direction of the vehicle $V_e$, equipped with its positioning module, server S, whereas the guidance command OG is received at the moment $T_0+T_1+T_2$, where $T_2$ designates the return latency time in the direction from the server S toward the vehicle $V_e$.

Consequently, the vehicle has continued throughout the sum of the latency times $T_1+T_2$, the initial latency time and the return latency time, respectively, and the guidance command OG may arrive too late for the driver to be able legitimately to carry out the right turn manoeuvre, as illustrated in FIG. 1b.

By way of non-limiting example, in FIG. 1b, and given the value of the latency times $T_1+T_2$=three successive periods, it may be noted, with reference to FIGS. 1a and 1b, that the transmission of the position coordinates $X_{0+j-1}, Y_{0+j-1}$, at the moment $T_{0+j-1}$, for example, does not allow the vehicle $V_e$ to receive the guidance command OG legitimately in order to carry out the process of changing the direction of the vehicle at the junction T. The guidance command OG emitted at the moment $T_{0+j-1}+T_1$ and received at the moment $T_{0+j+2}$, for example, as illustrated in FIG. 1b, arrives too late, the vehicle $V_e$ having followed its itinerary without changing direction by turning right.

The method according to the present invention will now be described with reference to FIGS. 2a, 2b and 2c.

Figure 2A:
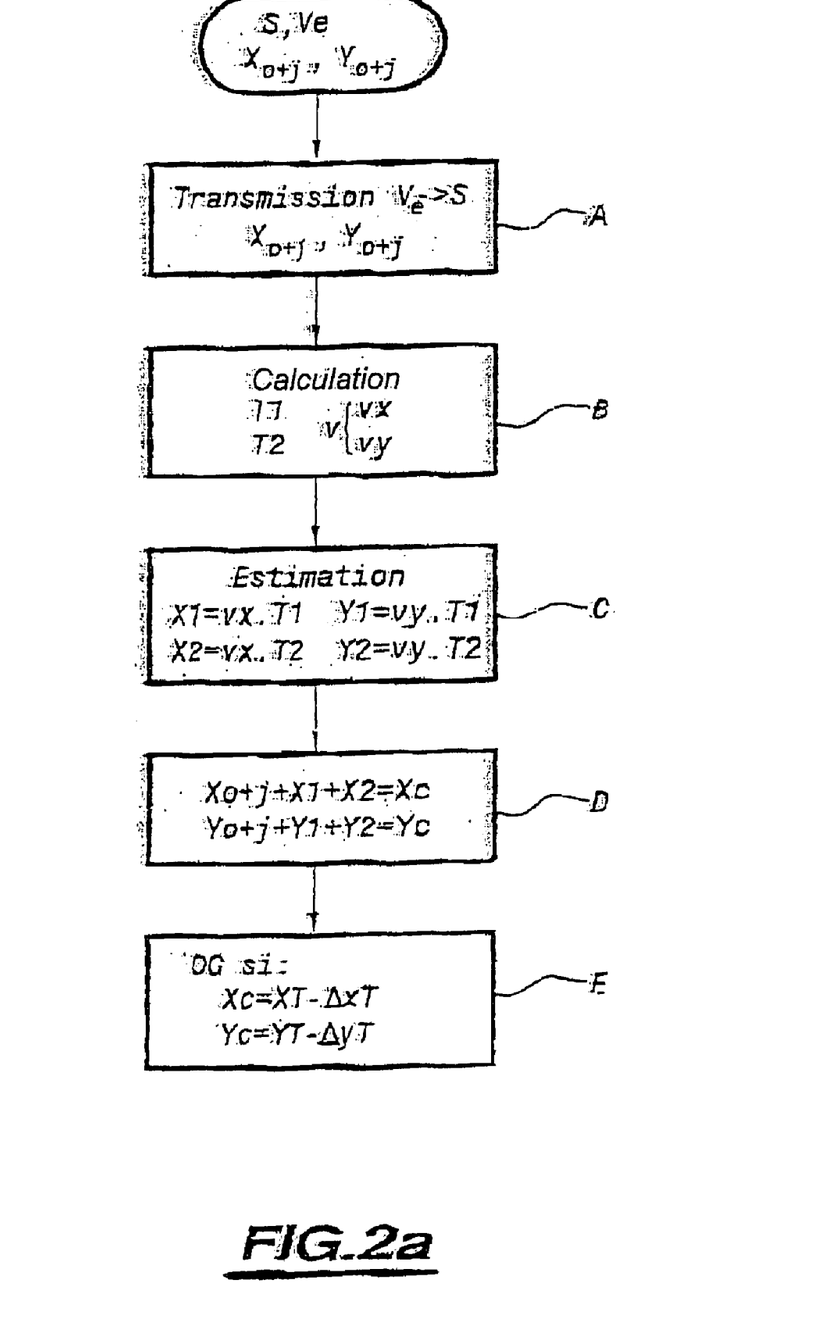
FIG. 2a is, by way of example, a flow chart of the steps for carrying out the method according to the invention.

FIG. 2a illustrates the situation in which the landborne vehicle $V_e$ is provided with an off-board navigation system in which the navigation and guiding data is processed in a remote manner in the navigation and guiding server S, which is external to this vehicle.

The data is processed from an on-board positioning module in this vehicle, the aforementioned GPS module, for example, which allows the position information, the successive coordinates $X_{0+j}, Y_{0+j}$ of the vehicle, to be communicated to the server S.

The same FIG. 2a indicates that the method according to the invention consists, in a step A, in transmitting position coordinates of the vehicle at a given current moment from the positioning module, i.e. the vehicle $V_e$, to the server S. Conventionally, the position coordinates are denoted $X_{0+j}, Y_{0+j}$, and, correspondingly, the corresponding moments are successively denoted $T_{0+j}$.

The frequency and the transmission period of these coordinates may, of course, be fixed or indexed to the average speed v of the vehicle.

The aforementioned step A is then followed by a step B, consisting in calculating, in the server S, the initial latency time $T_1$ and the return latency time $T_2$, the initial transmission time and the return transmission time, respectively, between the vehicle and the server.

In a preferential non-limiting embodiment of the method according to the present invention, the initial latency time $T_1$ is considered to be substantially equal or equal to the return latency time $T_2$.

This hypothesis is legitimately established by virtue of the fact that the server is, in all of the cases, relocated and the sampling carried out for the transmission of the successive position coordinates $X_{0+j}, Y_{0+j}$ is sufficiently rapid.

The step B is then followed by a step C, consisting in estimating, from current mapping information corresponding to the current geographical position of the vehicle $V_e$ and from an estimation of the average speed of the vehicle over at least part of an itinerary It of this vehicle located relative to current mapping information, the distance covered by the vehicle during the initial latency time and the return latency time, respectively.

This process is represented in step C of FIG. 2a by the following equations:

$$X_1 = v_x T_1, Y_1 = v_y T_1; X_2 = v_x T_2, Y_2 = v_y T_2.$$

It will be understood, in particular, that the information regarding the average speed v of the vehicle, over the road segment portion followed, may be broken down into speeds $v_x$ and $v_y$ along the x and y axes, this information being available in a database describing the road network for the mapping in question. Consequently, $X_1$ and $X_2$ represent the variations in the position coordinates of the vehicle $V_e$ during the initial latency time and the return latency time, respectively.

The method according to the present invention is then followed by a step D, consisting in correcting the position coordinates of the vehicle at the current moment $T_{0+j}$ by the value of the distances covered during the initial latency time and the return latency time $T_1$ and $T_2$, respectively, in order to generate corrected position coordinates $X_c, Y_c$.

In the aforementioned step D, the correction process is represented by the equations:

$$X_{0+j} + X_1 + X_2 = X_c$$

$$Y_{0+j} + Y_1 + Y_2 = Y_c$$

Step D is then followed by a step E, which, according to a noteworthy aspect of the method according to the present invention, consists in triggering the transmission of a guidance command OG from the server S to the vehicle $V_e$ if the corrected coordinates $X_c, X_c$ correspond to a positioning of the vehicle $V_e$ allowing an appropriate reaction of the user of the vehicle in accordance with the guidance command in question.

In step E of FIG. 2a, the process for triggering the transmission of the guidance command OG is given by the condition:

$$X_C = X_T - \Delta_{XT}, Y_C = Y_T - \Delta_{YT}$$

where $X_c, Y_c$ designate the corrected coordinates and $X_T, Y_T$ designate the change of direction coordinates located in the current mapping information available in the server. Moreover, according to a more particular aspect for carrying out the method according to the invention, $\Delta_{XT}$ and $\Delta_{YT}$ are values allowing a guard distance to be defined relative to the coordinates of the centre T of the change of direction, allowing the user to carry out the change of direction manoeuvre in the correct and safe manner. This guard distance may be a function of the average speed of the vehicle.

Figure 2B:
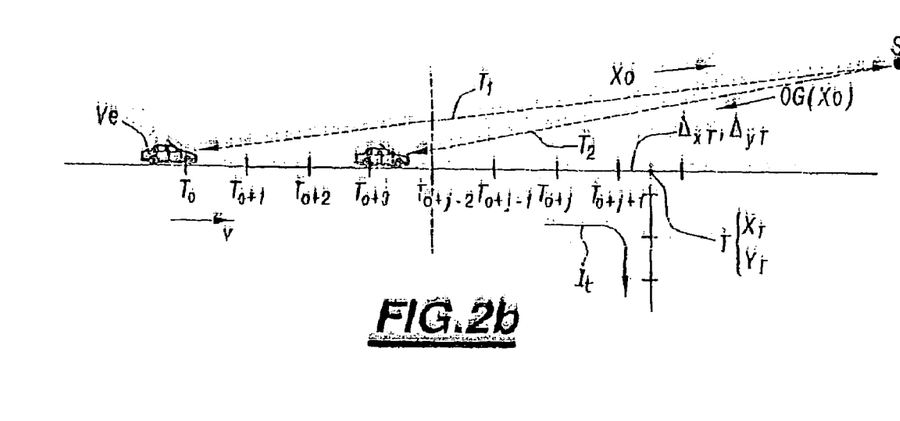
FIG. 2b is, by way of example, a time diagram similar to that of FIG. 1a, but in which the drawback of the remote navigation systems of the prior art is eliminated as a result of carrying out the method according to the invention.
Figure 2C:
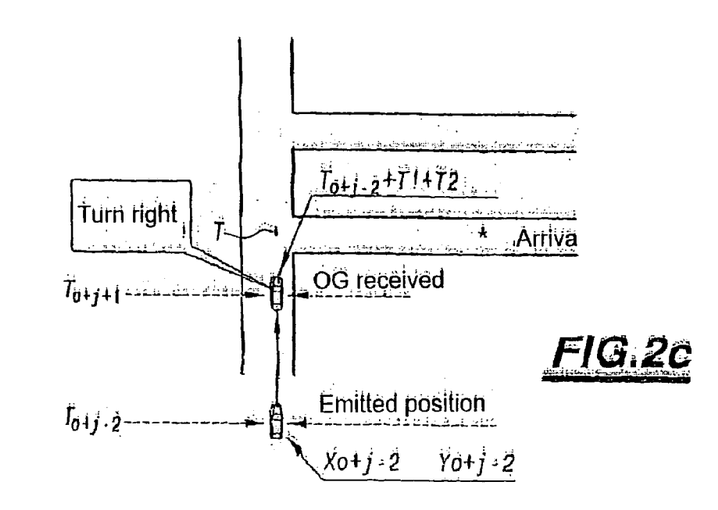
FIG. 2c is, by way of example, a diagram of a situation similar to that of FIG. 1b, but in which the drawback of the remote navigation systems of the prior art is eliminated.

Under these conditions, the guidance command OG, as illustrated in FIGS. 2b and 2c, arrives in the region of the vehicle $V_e$ at a moment at which the user of the vehicle may legitimately react in order to carry out the manoeuvre indicated by the guidance command.

In order to carry out the method according to the present invention, it will be noted that all of the exchanges of information between the vehicle $V_e$ and the server S are time-stamped and the internal clocks of said vehicle and said server are, of course, synchronised.

It is thus possible to deduce from this information the initial latency times $T_1$ in the direction from the vehicle $V_e$ toward the server S and in the return direction $T_2$ from the server S toward the vehicle $V_e$.

In a preferential non-limiting embodiment, the latency times may be calculated in the server S, as indicated below.

$T_1$=time-stamping of the server receiving data from the positioning module of the vehicle $V_e$–time-stamping of the emission of the positioning coordinates by the positioning module of the vehicle $V_e$;

$T_2$=time-stamping of the module for receiving the server S data–time-stamping of the emission by the server S.

FIG. 2b illustrates a situation similar to that of FIG. 1a, the transmission of the positioning coordinates allowing the manoeuvre to be executed correctly by the corresponding user, in the example given above, taking place at the current moment $T_{0+j-2}$ for a total latency time $T_1 + T_2$ corresponding to three transmission periods of the positioning coordinates.

Under these conditions, the guidance command OG may then be received substantially at the moment $T_{0+j+1}$, which is prior to the moment at which the vehicle reaches the turning point T of coordinates $X_T, Y_T$.

This situation is also illustrated in FIG. 2c.

The identity represented in step E of FIG. 2a for transmitting the guidance command OG may, of course, be accompanied by the guard distance for receiving the guidance command $\Delta_{XT}$ and $\Delta_{YT}$, which may, of course, be a function of the average speed of the vehicle.

This mode of operation ensures that the guidance command is received at a moment sufficiently prior to the moment at which the vehicle reaches the point of coordinates $T_1, X_T, Y_T$ to allow the driver to carry out the necessary manoeuvre for changing direction.

It will thus be understood that the process consisting in triggering the transmission of the guidance command OG from the server S to the vehicle may advantageously be carried out at a given moment allowing coincidence between the corrected coordinates $X_C, Y_C$ and the coordinates of the given point $X_T, Y_T$ for changing the direction of the vehicle over at least part of a route of the vehicle located relative to current mapping information, if the equations are substantially confirmed $X_C = X_T$ and $Y_C = Y_T$ around the guard time.

Generally, if the on-board positioning module on the vehicle $V_e$ is formed by a GPS terminal, the current moments at which the positioning module transmits the position coordinates of the vehicle may then be periodic, as described above in the case of FIGS. 2a to 2c, wherein the value of the sampling period of the positioning of the vehicle, i.e. of the moments at which the position coordinates are transmitted to the server S, may correspond to a period value that is a multiple of the duration of a GPS frame.

A more detailed description of a vehicle-external navigation and guiding server, an off-board-type server according to the subject of the present invention allowing, of course, the method according to the invention to be carried out, as described above, will now be given with reference to FIG. 3.

Figure 3:
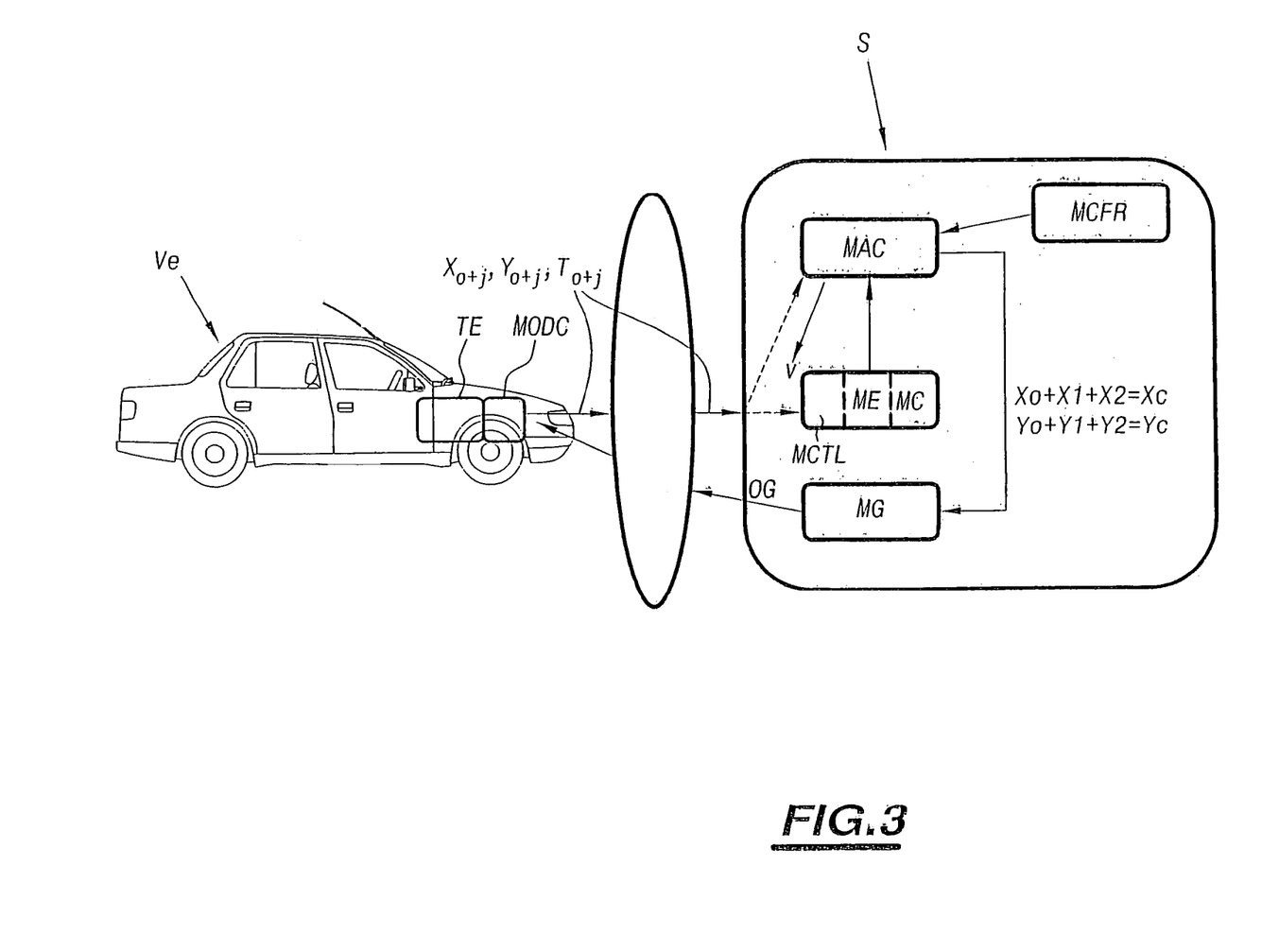
FIG. 3 is a functional block diagram of a specific server that is more particularly suitable for carrying out the method for guiding in real time a landborne vehicle according to the subject of the present invention.

More specifically, the vehicle $V_e$ is equipped with a navigation terminal TE and with a communication module MODC.

Generally, it will be noted that the navigation and guiding server S according to the present invention may be formed by a dedicated navigation and guiding server forming an off-board navigation and guiding system of the conventional type, to which a set of functionalities and functional modules, which will be described below, is added.

Conventionally, the server S according to the subject of the present invention comprises a module MAC for adapting mapping information as a function of the position coordinates $X_{0+j}$, $Y_{0+j}$, as described above with reference to the method according to the present invention.

The server S also comprises a module MCFR for calculating the road sheet itinerary, allowing the mapping adaptation module MAC to be steered, and also a module MG for guiding the vehicle $V_e$ that receives position information delivered by the information adaptation module MAC. The guidance module MG delivers a guidance command OG on coincidence of the position information delivered by the information adaptation module with position information regarding a change in direction of a route referenced relative to the aforementioned mapping information.

In addition to the conventional modules known from the prior art, the server S according to the present invention comprises a module MCTL for calculating the initial latency time $T_1$ and the return latency time $T_2$, these times being defined as the initial transmission time and the return transmission time, respectively, between the vehicle $V_e$ and the server. It will be understood that the module MCTL allows step B of FIG. 2a to be carried out.

The system also comprises a module ME for estimating, from current mapping information corresponding to the current geographical position of the vehicle $V_e$ and from an estimation of the average speed v of the vehicle over at least part of a route $1t$ of said vehicle relative to current mapping information, the distance covered by the vehicle during the initial latency time and the return latency time, respectively.

It will be understood, in particular, that the estimation module ME allows step C of FIG. 2a to be carried out.

Finally, the server S according to the present invention comprises a module MC for correcting the position coordinates of the vehicle at the current moment, by the value of the distances covered during the initial latency time and the return latency time, respectively, in order to generate corrected position coordinates according to the equations given in step D of FIG. 2a.

According to a noteworthy aspect of the server according to the present invention, the corrected position coordinates $X_C$, $Y_C$ are substituted for the position information delivered to the guidance module MG.

This mode of operation allows the transmission of a guidance command OG to be triggered from the server S to the vehicle $V_e$ if the corrected coordinates $X_C$, $Y_C$ correspond to a positioning of the vehicle allowing an appropriate reaction of the user of the vehicle in accordance with the guidance command OG.

The aforementioned coincidence is produced in accordance with step E of FIG. 2a. The equations given in step E may, of course, include the introduction of a guard time, as mentioned above in the description, in order to allow the user of the vehicle $V_e$ to execute the manoeuvre under optimal vehicle guidance and safety conditions.

Furthermore, as illustrated in FIG. 3, the module MCTL for calculating the latency time comprises at least means for storing the average speed of the vehicle, speed v, which are optionally broken down on the x, y coordinate axes of the mapping means, this average speed being established over at least one period of time separating the current moment from the preceding current moment.

It will be understood, in particular, that it is, of course, possible to calculate, from the successive sets of position information $X_{0+j}$, $Y_{0+j}$ and $X_{0+j+1}$, $Y_{0+j+1}$, particularly from the time-stamped information, the average speed of the vehicle over at least one period of time separating the current moment and a preceding current moment.

Finally, the module MAC may also comprise a module for selecting the moment for transmitting the guidance command from the server to the vehicle as a function of the average speed of the vehicle.

By way of non-limiting example, it will be noted that this selection module does, of course, take into account the guard time and the time for propagating the guidance command between the server S and the vehicle $V_e$, wherein this propagation time may be defined, for example, as the average arithmetic latency time $T_2$ of the sum of the initial latency time and the return latency time, respectively.

The modules MCTL, ME and MC may advantageously be formed by software modules that are executed directly by the central unit of the server S (not illustrated in the drawings).

The invention claimed is:

1. Method for guiding in real time a landborne vehicle provided with an on-board navigation system, wherein the navigation and guiding data is processed in a remote manner in a navigation and guiding server external to the vehicle, from an on-board positioning module in this vehicle and communicating information regarding the position of the vehicle to said server, wherein said method consists in at least:

a) transmitting from said positioning module to said server position coordinates of the vehicle at a first given moment;
   b) calculating, in said server external to the vehicle, the initial latency time and the return latency time, respectively, between said vehicle and said server;
   c) estimating, from current mapping information corresponding to the current geographical position of said vehicle and from an estimation of the average speed of said vehicle over at least part of an itinerary of said vehicle located relative to this current mapping information, the distance covered by the vehicle during the initial latency time and the return latency time, respectively;
   d) correcting said position coordinates of the vehicle at the first given moment by the value of the distances covered during the initial latency time and the return latency time, respectively, in order to generate corrected position coordinates;
   e) triggering the transmission of a guidance command from said server to the vehicle if said corrected coordinates correspond to a positioning of the vehicle allowing an appropriate reaction of the user of the vehicle in accordance with the guidance command.

2. Method according to claim 1, and further comprising estimating the average speed of the vehicle between said first given moment and a preceding earlier given moment for transmitting the position coordinates of said vehicle.

3. Method according to claim 1, wherein the initial latency time and the return latency time are calculated by the time-stamp difference of messages exchanged between the vehicle and the server.

4. Method according to claim 2, wherein the initial latency time and the return latency time are calculated by the timestamp difference of messages exchanged between the vehicle and the server.

5. Method according to claim 1, wherein said corrected position coordinates confirm the equation:

$$\begin{cases} X_0 + X_1 + X_2 = X_C \\ Y_0 + Y_1 + Y_2 = Y_C \end{cases}$$

wherein $(X_0, Y_0)$ designate the vehicle position coordinates at each given moment;

$X_1, Y_1$ designate the variations in the position coordinates of the vehicle during the initial latency time;

$X_2, Y_2$ designate the variations in the position coordinates of the vehicle during the return latency time.

6. Method according to claim 4, wherein the triggering the transmission of a guidance command from said server to said vehicle is carried out at one given moment allowing coincidence between said corrected coordinates $(X_c, Y_c)$ and the coordinates of a given point $(X_T, Y_T)$ for changing the direction of the vehicle over at least part of a route of the vehicle located relative to the current mapping information $$X_C = X_T - \Delta_{XT}$$

$$Y_C = Y_T - \Delta_{YT},$$

equations in which $\Delta_{XT}$ and $\Delta_{YT}$ represent a guard rime.

7. Method according to claim 1, wherein, said on-board positioning module is formed by a GPS terminal, said given moments at which the positioning module transmits the position coordinates of the vehicle are periodic, by a period value that is a multiple of the duration of a GPS frame.

8. Vehicle-external navigation and guiding server, said server receiving position coordinates of the vehicle at one of plural given moments and comprising:

at least one module configure to adapt mapping information as a function of said position coordinates;

a module configure to calculate the road sheet itinerary steering said mapping adaptation module;

a module configure to guide said vehicle receiving position information delivered by said information adaptation module and delivering a guidance command on the position information being delivered by said information adaptation module with position information regarding a change in direction of a route reference relative to said mapping information;

a module configure to calculate the initial latency time and the return latency time, respectively, between said vehicle and said server;

a module configure to estimate, from current mapping information corresponding to the current geographical position of said vehicle and from an estimation of the average of said vehicle over at least part of a route of said vehicle relative to this current mapping information, the distance covered by the vehicle during the initial latency time and the return latency rime, respectively; and a module configure to correct said position coordinates of the vehicle at the moment by the value of the distances covered during the initial latency time and the return latency time, respectively, in order to generate corrected position coordinates, said corrected position coordinates being substituted for position information delivered to said guiding module, thus allowing the transmission of a guidance command to be triggered from said server to the vehicle if said corrected coordinates correspond to a positioning of the vehicle allowing an appropriate reaction of the user of the vehicle in accordance with the guidance command, said server being external to said vehicle.

9. Server according to claim 8, wherein said module for calculating the latency time comprises at least means for storing the average speed of the vehicle over at least one period of time separating one given moment and a preceding given moment.

10. Server according to claim 8, wherein said module for calculating the latency time also comprises means for selecting the moment for transmitting the guidance command from said server to said vehicle, as a function of the average speed of said vehicle.

11. Server according to claim 9, wherein said module for calculating the latency time also comprises means for selecting the moment for transmitting the guidance command from said server to said vehicle, as a function of the average speed of said vehicle.

* * * * *

UNITED STATES PATENT AND TRADEMARK OFFICE
CERTIFICATE OF CORRECTION

PATENT NO. : 7,590,489 B2
APPLICATION NO. : 11/073706
DATED : September 15, 2009
INVENTOR(S) : Auger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1130 days.

Signed and Sealed this

Twenty-first Day of September, 2010

David J. Kappos
*Director of the United States Patent and Trademark Office*